US008136036B2

(12) United States Patent
Gibbons, Jr. et al.

(10) Patent No.: US 8,136,036 B2
(45) Date of Patent: *Mar. 13, 2012

(54) SYSTEM AND METHOD FOR PROCESSING DYNAMIC DATA SETS IN WEB APPLICATIONS

(75) Inventors: Michael P. Gibbons, Jr., Bronxville, NY (US); Sharmila Ramachandran, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 884 days.

This patent is subject to a terminal disclaimer.

(21) Appl. No.: 12/156,016

(22) Filed: May 29, 2008

(65) Prior Publication Data

US 2008/0235572 A1  Sep. 25, 2008

Related U.S. Application Data

(63) Continuation of application No. 10/768,837, filed on Jan. 29, 2004, now Pat. No. 7,395,502.

(51) Int. Cl.
*G06F 17/00* (2006.01)
(52) U.S. Cl. ....................................................... 715/255
(58) Field of Classification Search .................. 715/225, 715/255
See application file for complete search history.

(56) References Cited

U.S. PATENT DOCUMENTS

| | | | |
|---|---|---|---|
| 5,495,608 A | 2/1996 | Antoshenkov | 395/600 |
| 5,666,528 A | 9/1997 | Thai | 395/613 |
| 5,812,996 A | 9/1998 | Rubin et al. | 707/2 |
| 5,822,749 A | 10/1998 | Agarwal | 707/2 |
| 6,249,789 B1 | 6/2001 | Delia et al. | 707/102 |
| 6,745,229 B1 | 6/2004 | Gobin et al. | 709/206 |
| 7,096,223 B2 | 8/2006 | Cope | 707/100 |

FOREIGN PATENT DOCUMENTS

| | | |
|---|---|---|
| JP | 2001028005 A | 1/2001 |
| WO | WO9841935 A2 | 9/1998 |

OTHER PUBLICATIONS

Ventatesh Ganti, Johannes Gehrke, Raghu Ramakrishnan. *DEMON: Mining and Monitoring Evolving Data*, IEEE Transactions on Knowledge and Data Engineering, vol. 13, No. 1, Jan./Feb. 2001. 50-63.

*Primary Examiner* — William Bashore
*Assistant Examiner* — Henry Orr
(74) *Attorney, Agent, or Firm* — Schmeiser, Olsen & Watts; William Schiesser

(57) ABSTRACT

Large data sets are displayed and processed. User mark-up language display provides a plurality of line items, each line item including a checkbox. A name/value pair is generated and stored to a text string responsive to the user selecting a checkbox of a line item. The name/value pairs are parsed into a parameter names array and a parameter values array responsive to the user selecting a submit command. The parameter names array is processed to identify each parameter name containing a checkbox indicia, and for each parameter name containing a checkbox indicia, line item detail is retrieved from the detail arrays corresponding for display to the user, who may store a current document as a draft. The user selects or deselects a line item, and the parameter names array is again processed to identify new data available in, or old data no longer available in, the detail arrays.

5 Claims, 8 Drawing Sheets

SYSTEM AND METHOD FOR PROCESSING DYNAMIC DATA SETS IN WEB APPLICATIONS

This application is a continuation of and claims priority to application Ser. No. 10/768,837, filed 29 Jan. 2004 now U.S. Pat. No. 7,395,502 by Michael P. Gibbons, Jr. and Sharmila Ramachandran for System and Method for Processing Dynamic Data Sets in Web Applications.

BACKGROUND OF THE INVENTION

1. Technical Field of the Invention

This invention relates to displaying and processing data sets. More particularly, it relates to paging and processing large data sets.

2. Background Art

Referring to FIG. 1, in order to display and process large dynamic sets of data based on a users selection in a Lotus Notes web environment, in a known system a single call 88 is made to a host system 80 to retrieve from database 82 all required data. This is done through ODBC (Open DataBase Connectivity). These calls 88 are expensive because they originate at a user browser 90, are transmitted through Internet cloud 86, and pass through a firewall 84 to access the host database 82.

Referring to FIG. 2, each set 58 of data contains line item information 53, 54. If a user selects that line item (via HTML checkbox 51, 52) then all data 55, 56 pertaining to that line item needs to be accessed when processing the page. The problem is two fold: sets 58 are dynamic and can be large, containing hundreds of line items.

Referring to FIG. 3, in order to process such large amounts of data on the Notes Platform 60, HTML 62, Notes hidden fields 66, a Notes CGI variable 64 and LotusScript 92 have been used. A LotusScript agent 92 loads a document 96 containing HTML 62 and Notes hidden fields 66. HTML and Notes fields 62, 66 are populated by processing queries to an external source (in this case it uses ODBC 88 to connect to DB2 82).

Referring to FIG. 4, HTML 62 contains three tables 104, 106, 108 with multiple line items for each table. Each line item contains a checkbox 51, 52, 57 and each checkbox is given a unique value 110, 112, 114 starting at 1 and incrementing by 1 for each line item within a table. All line item detail 72 is stored in Notes multi-valued fields 66 which are hidden on the page 96. As is represented by line 67, these fields 66 are assigned dynamic arrays 68. To handle large sets of data, the following is done when assigning the dynamic arrays 68 (xxxDynArray) to the Notes fields 66 (xxxDetail) in a document 96 (request):

(1) Set xxxItem=request.ReplaceItemValue ("xxxDetail", xxxDynArray( ))

and to prevent a Notes limitation on the page summary size when saving the request document:

(2) xxxItem.IsSummary=False

When a user selects a line item by clicking a checkbox 51, 52, the name/value pair 74 for that checkbox is stored in a Notes CGI variable Request_Content 64.

Referring to FIG. 5, Request_Content 64 is a text string 102 holding HTML form data in name/value pairs, ex: "checkBoxName1=val1&checkBoxName2=val2& . . . . " In FIG. 5, the layout and relationship of the main data holders are illustrated, including CGI variable 64 and arrays 104, 106 and 108. CGI variable 64 gets broken into two arrays: parameter names 104 and parameter values 106. If parameter names contains "Chkbx" for a given index 'i', then the value of the parameter values for index 'i' contains the index 'j' for the records information in the detail array 108.

Referring to FIG. 6 in connection with FIG. 5, when a user is finished selecting line items at display 94 of user browser 90, he will click the submit button 120 and a LotusScript agent 122 will run to process the document 96.

First, Request_Content 64 is exploded into a variant type array 102 containing name/value pairs, ex: first index of the array contains "checkBoxName1=val1", second index of the array contains "checkBoxName2=val2" etc. . . . . Next, the name and values are separated into parameter name array 104 and parameter value array 106. Next, each parameter name 70 is processed in a loop 124. If the value 70 of the parameter name 104 for the loop index (not shown) contains "checkBoxName" (as is the case with rows 1 and 4), all the appropriate line item values 72 (for rows 1 and 4) are retrieved from detail arrays (Notes hidden fields) 66. For example, say paramName[i]70="CheckBoxName" that means the user selected that checkbox and name process 124 retrieves the line item detail 72 by using the unique value paramValue[i] 71 (for name row 1, that value is 1, for name row 4, that value is 3) as the index to the hidden fields 108 for that checkbox 70.

In this system, only checkboxes 51, 52 that are checked by the user will be stored in the Request_Content variable 64. The associated values 106 of the checkboxes are all the indices 112 that need to be accessed in the Notes hidden variables 108.

Referring further to FIG. 5, the invoice amounts that the user has entered have to be matched to the checkboxes that have been checked. This is accomplished by keeping track of the previous value when looping through the parameter names arrays. If the previous value is a CHKBX and the current value is AMT, it knows to retrieve the value from the parameter values array that has the same index.

Processing occurs in a loop 124 and therefore is dynamic based on the data set 58 size, which can be large in itself.

One use of this application allows dealers to create remittances from the web. A remittance is the stub for paying invoices. A remittance can consist of three types of data, Schedule Payment Plan Invoices, Pay As Sold Invoices and Suspense Credits. Each type of set 58 contains its own data 55, 56, with a dynamic number of line items 110. Using the method described above allows for the creation of large Remittances via the web on an existing Notes Platform.

Currently a single call 88 is made to the host system 80 to retrieve all required data from database 82. This is done through ODBC (Open DataBase Connectivity). These calls are expensive as they are through Internet 86 and firewall 84 to access host database 82. It is needed in the art to provide an application which does not impact the host system 80 to make calls to retrieve the data required for a single page 96.

SUMMARY OF THE INVENTION

A system, method and program storage device is provided for displaying and processing large data sets by storing to detail arrays line item detail; displaying to a user mark-up language including a plurality of line items, each line item including a checkbox; responsive to the user selecting a checkbox of a line item, generating a corresponding name/value pair; storing the name/value pair to a text string; responsive to the user selecting a submit command, generating from a plurality of name/value pairs in the text string a parameter names array and a parameter values array; processing the parameter names array to identify each parameter name containing a checkbox indicia, and for each parameter name containing a checkbox indicia, retrieving from the detail arrays corresponding line item detail for display to the user.

Other features and advantages of this invention will become apparent from the following detailed description of the presently preferred embodiment of the invention, taken in conjunction with the accompanying drawings.

BEST MODE FOR CARRYING OUT THE INVENTION

In accordance with a preferred embodiment of the invention, paging allows a user to sort through a large dataset with a limited number of records presented on the screen 94 at a single time.

In accordance with the present invention, with a single call all the data is processed as described in background art.

Figure 1:
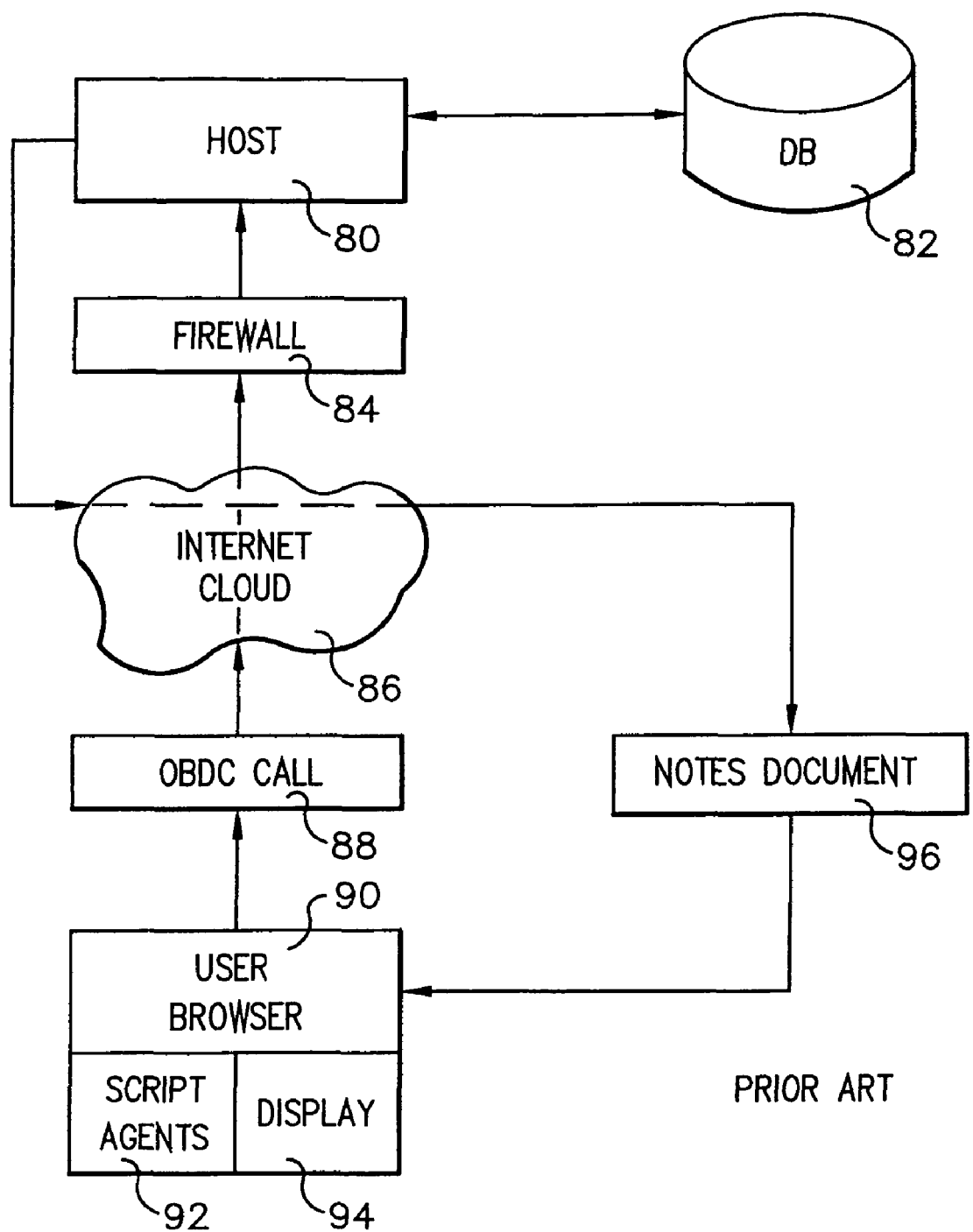
FIG. 1 is a high level system diagram of a prior art system for processing large datasets.
Figure 2:
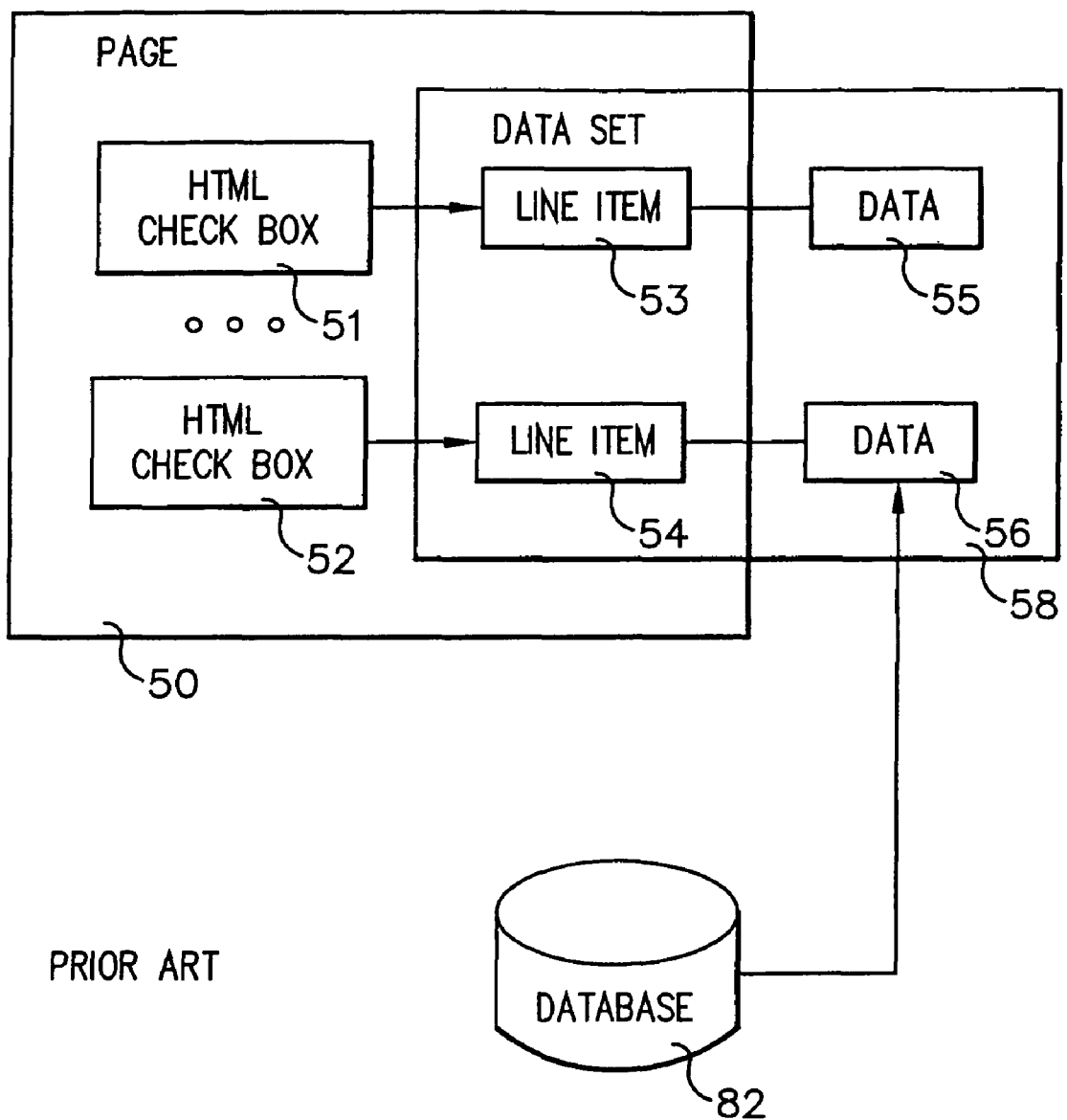
FIG. 2 is a schematic view of data sets in accordance with a prior art system.
Figure 3:
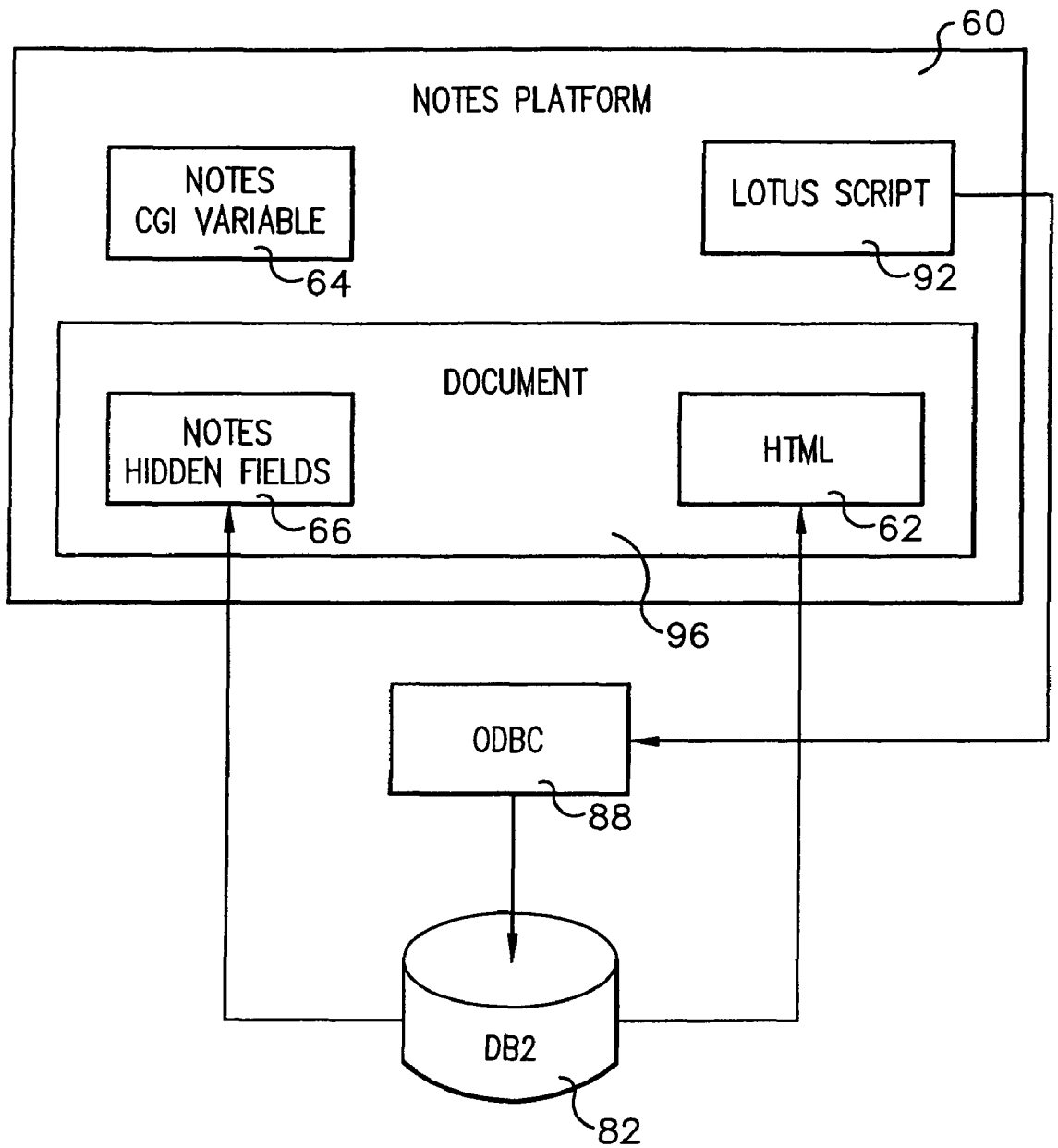
FIG. 3 is a schematic view of a prior art Notes platform.
Figure 4:
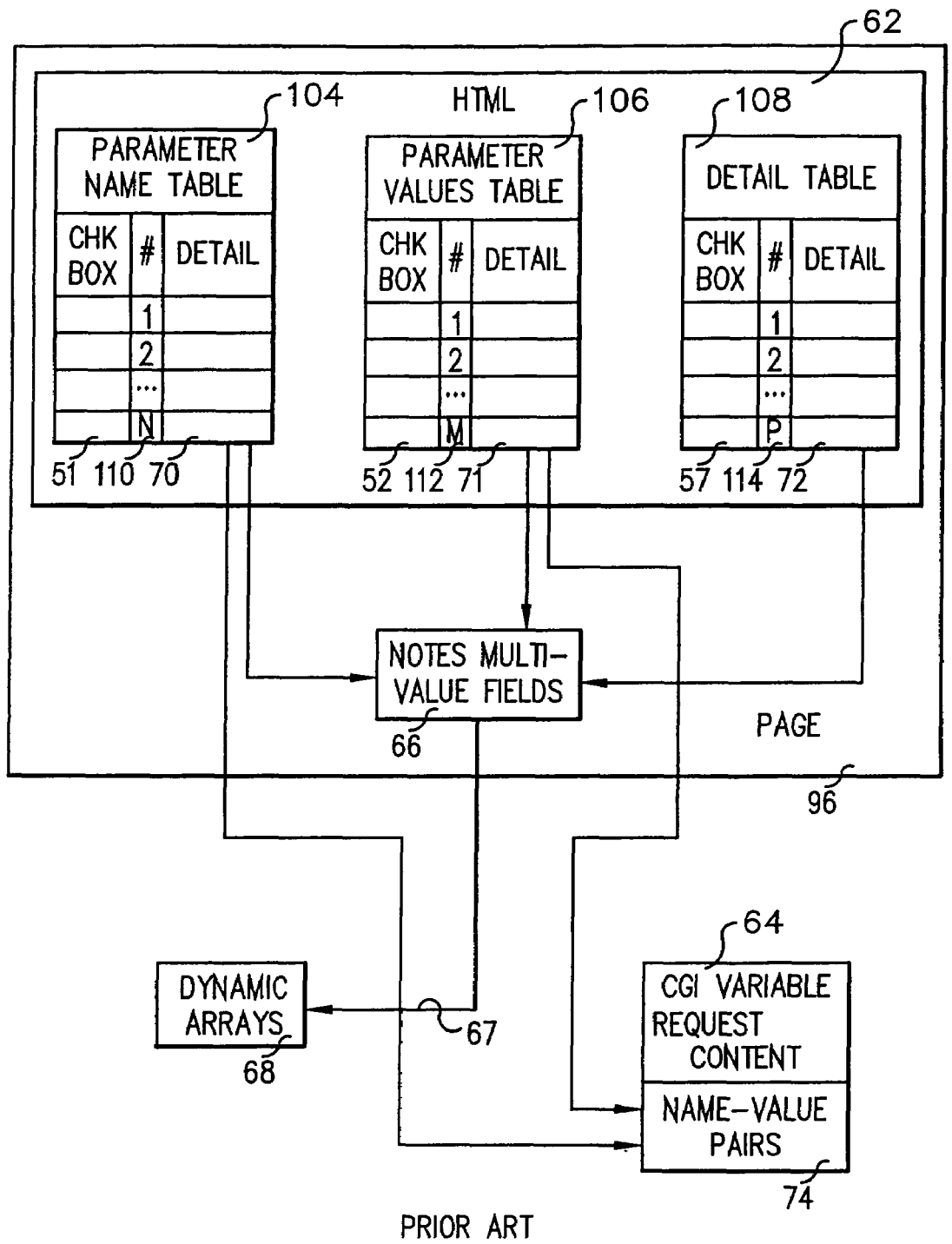
FIG. 4 is a schematic view of the HTML object of FIG. 3.
Figure 5:
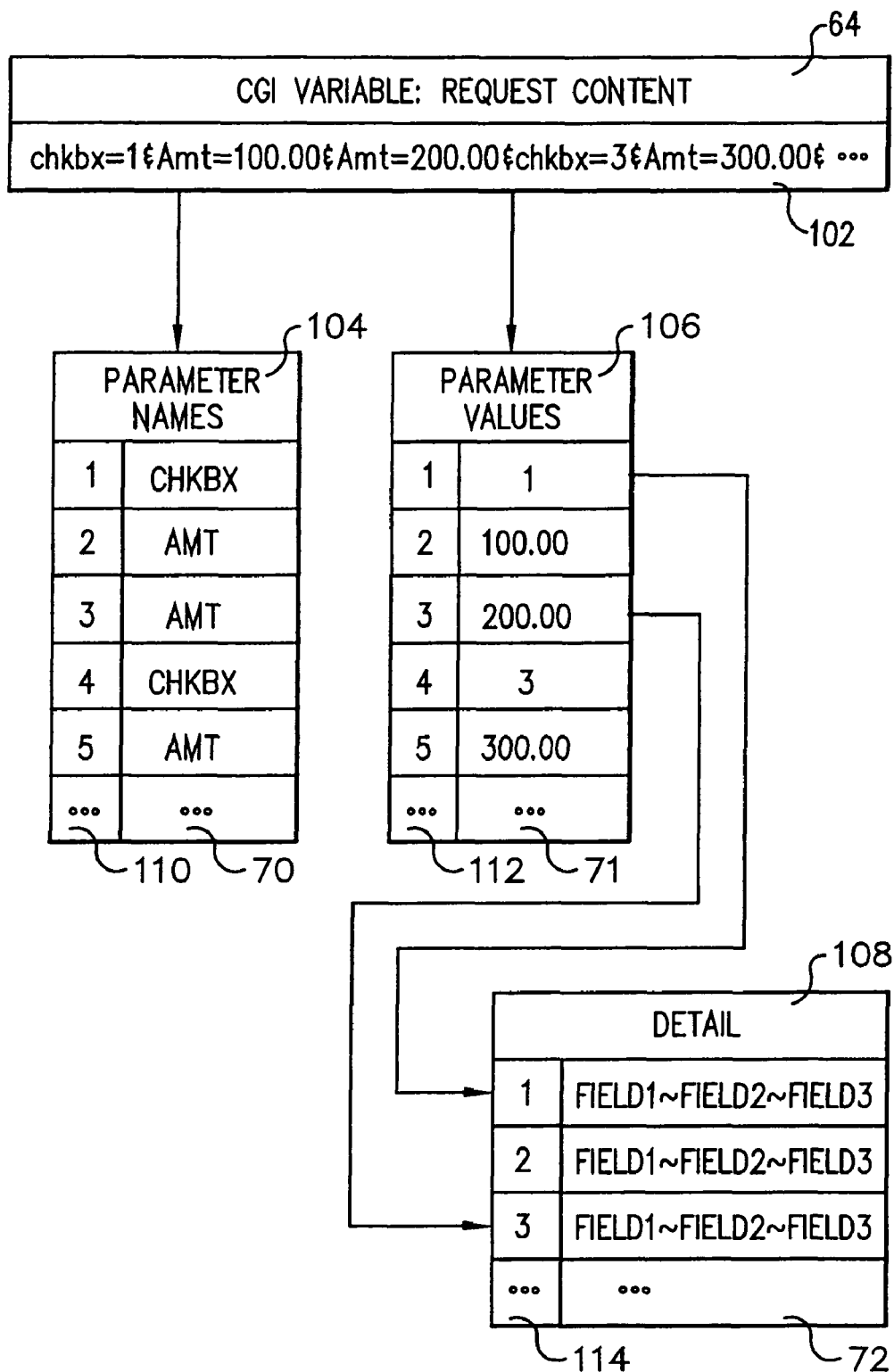
FIG. 5 is a schematic representation of processing the CGI variable request content of FIG. 4.
Figure 6:
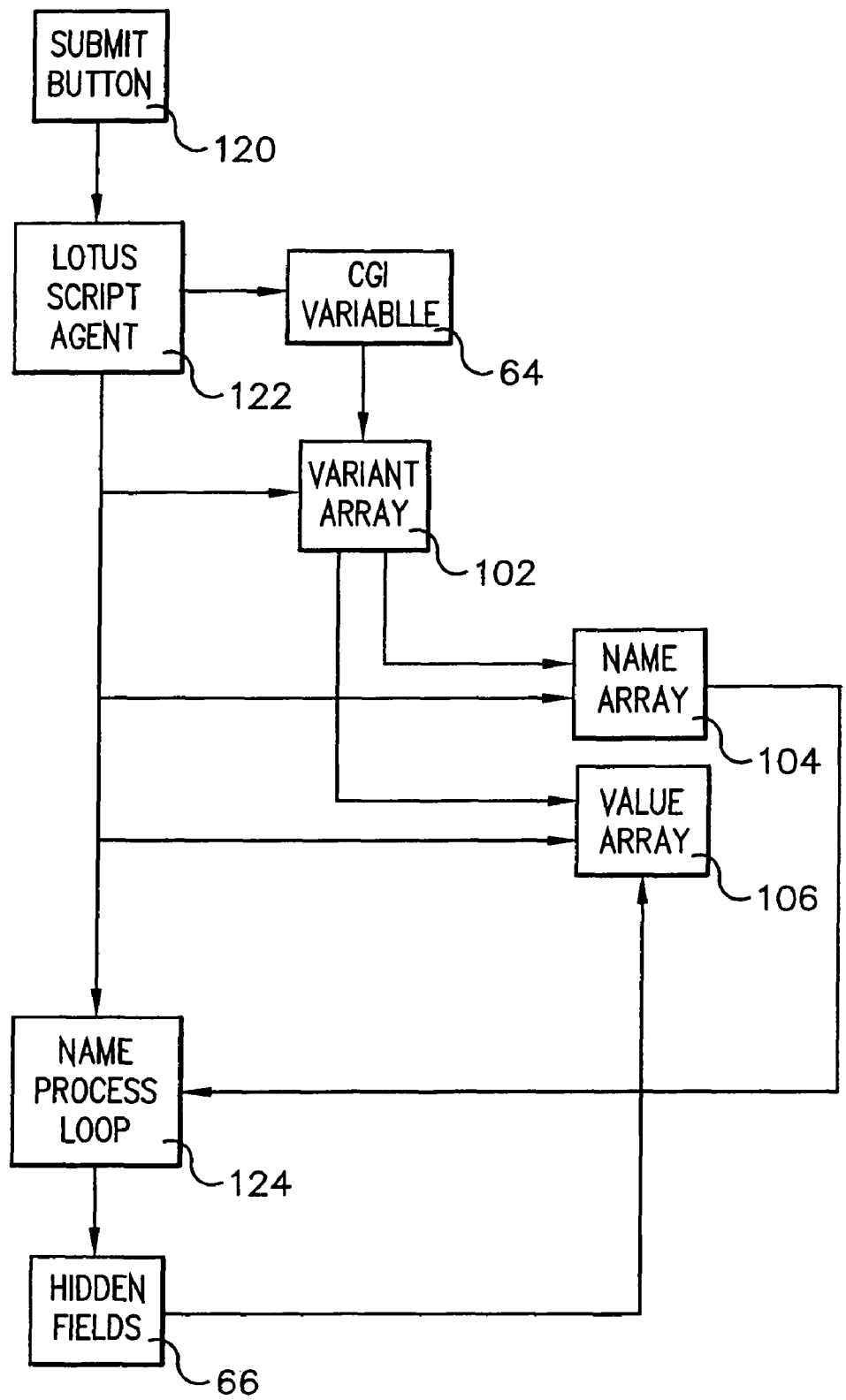
FIG. 6 is a schematic representation of processing in response to user selection of a submit button at the browser of FIG. 1.
Figure 7:
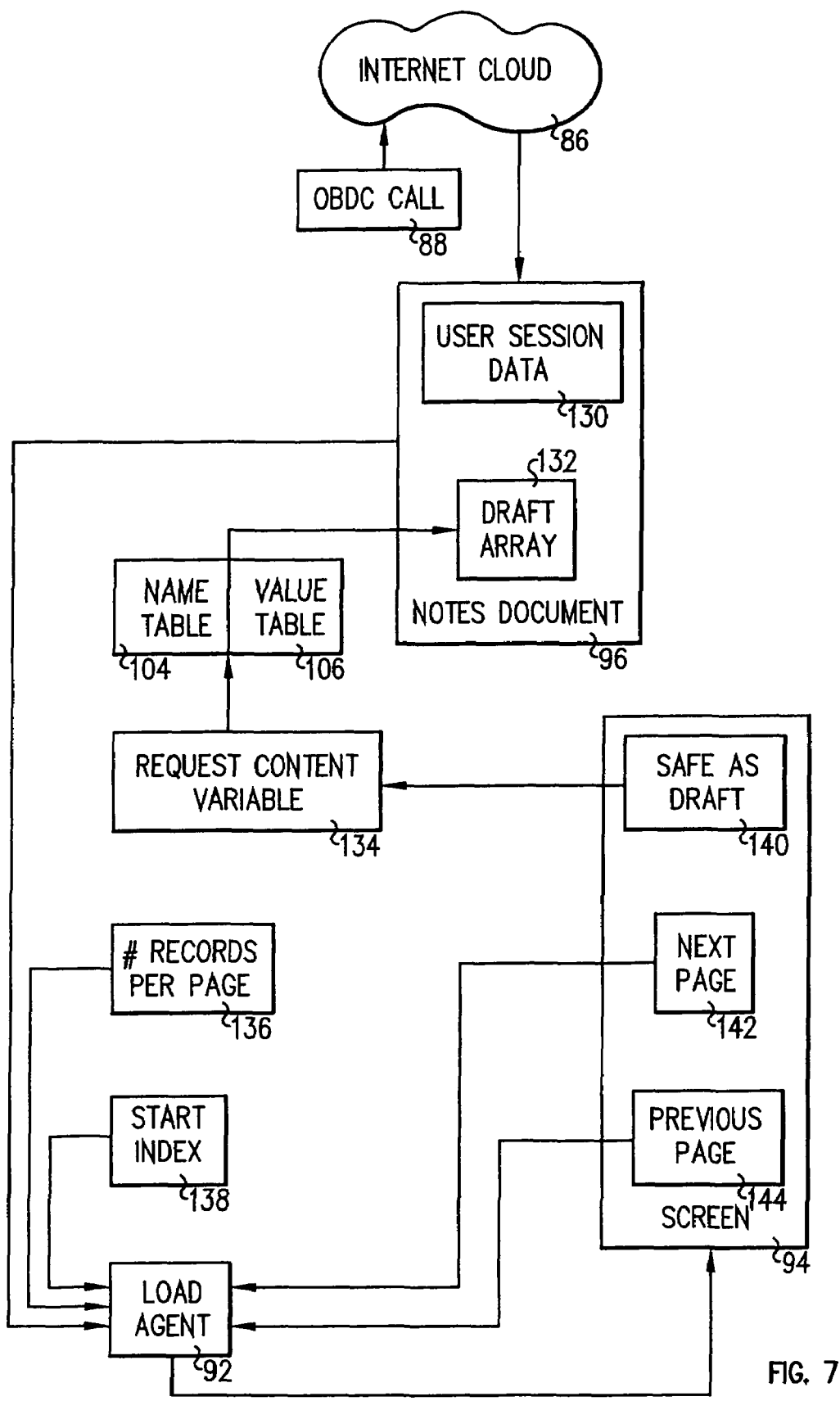
FIG. 7 is a schematic representation of a preferred embodiment of the invention.

Referring to FIG. 7, in order to implement paging, additional data holders are required. The first is a constant 136 equal to the number of records that will be displayed on screen 94. The second current starting index 138 for the page (default to 1). Each time the user clicks on the next page link or button 142, index 138 is incremented by the constant, and when the user clicks on previous page link or button 144, index 138 is decremented by constant 136.

Hidden Notes detail array fields 66, 130 retain all of the data for the user's session. This is accomplished by using the same Notes document 96 while paging. To the user it would look like a new display at screen 94, however, HTML 62 is generated dynamically each time a new set of records is requested. Dynamic HTML is generated by the LotusScript agent load agents 92. Each time a user activates button 142 or 144 to select a next or previous page, loading agent 92 creates HTML 62 required for screen 94 using the start index 138 for the page.

In accordance with a further aspect of the invention, a user may save a current document as a draft. This enables the user to edit data by selecting/deselecting rows and associated amount fields and then reexecuting the initial detail queries to determine if any new records are available or if any old ones are no longer available.

This is implemented as follows. When the user clicks on the save as draft button 140, Request_Content variable 64, 134 is parsed and two arrays created for parameter names 104 and values 106. Next key information 108 is obtained for each row 110 selected by the user. This information is stored in a draft array 132 saved in the Notes document 96.

When the user works with draft 132, data is retrieved from the host system 80 database 82 as before. When displaying the information at screen 94, key information 108 is checked to see if it exists in array 132 that was created during the save. If so, the corresponding checkbox 51 will be marked and the amount value 71 the user entered will be populated in text field 72.

The user can then work with the data, save again or submit.

Alternative Embodiments

It will be appreciated that, although specific embodiments of the invention have been described herein for purposes of illustration, various modifications may be made without departing from the spirit and scope of the invention.

While the preferred embodiment of the invention has been described in the context a Notes platform using HTML, Notes hidden fields, and a Notes CGI variable and LotusScript, the method and system of the present may also be implemented on other platforms, for instance with a WebSphere Application Server and Java instead of Notes/Domino and LotusScript.

Figure 8:
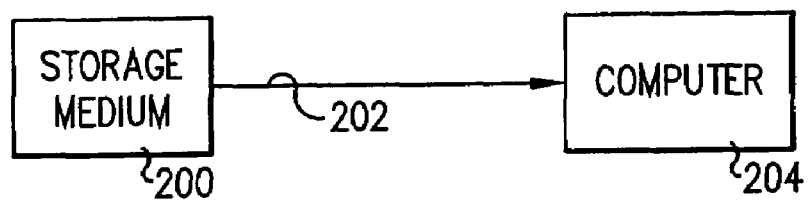
FIG. 8 is a high level system diagram illustrating a program storage device readable by a machine, tangibly embodying a program of instructions executable by a machine to perform method steps for paging and processing large data sets.

Referring to FIG. 8, in particular, it is within the scope of the invention to provide a computer program product or program element, or a program storage or memory device 200 such as a solid or fluid transmission medium, magnetic or optical wire, tape or disc, or the like, for storing signals readable by a machine as is illustrated by line 202, for controlling the operation of a computer 204, such as a host system or storage controller, according to the method of the invention and/or to structure its components in accordance with the system of the invention.

Further, each step of the method may be executed on any general purpose computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A system for displaying and processing large data sets in web applications responsive to user selection of records displayed while paging through a plurality of pages of said data set during a user session, comprising:
    a store for storing detail arrays line item detail;
    a display for displaying to a user mark-up language including a plurality of line items, each line item including a checkbox, said mark-up language being HTML;
    means for generating a corresponding name/value pair responsive to said user selecting said checkbox of said line item;
    a text string for storing said name/value pair;
    a parameter names array and a parameter values array;
    means for parsing a plurality of name/value pairs in said text string to said parameter names array and said parameter values array responsive to said user selecting a submit command;
    means for storing said parameter names array and parameter values array as an array of user request content variables in a same document for this and all other pages of said user session as said user pages through said dataset;

means for passing said document containing said request content variable to a load agent for dynamically pulling data from a host for processing said parameter names array to identify each parameter name containing a checkbox indicia, and for each parameter name containing said checkbox indicia, for retrieving from said detail arrays corresponding line item detail for display to said user;

a store for saving a current document as a draft;

a line item selector for said user to select or deselect a line item;

means for re-executing processing to identify new data available in said detail arrays or old data no longer available in said detail arrays;

a draft array for storing key information;

means responsive to said user selecting a save as draft command for parsing said name/value pairs in said text string to create a parameter name array and a parameter value array;

means for obtaining for each row selected by said key information, and storing said key information in said draft array; and means responsive to said user working with said draft array for checking data received from a host system for display to said user against said key information, and for line items checked in said draft array, displaying to said user data entered to said parameter value array of said draft array.

2. A program storage device readable by a machine, tangibly embodying a program of instructions executable by a machine to perform method steps for displaying and processing large data sets responsive to user selection of records displayed while paging through a plurality of pages of said data set during a user session, said method comprising:

providing in hidden detail array fields all data for said user session in a same document for this and all other pages of said user session as said user pages through said dataset;

providing a display size indicia data holder;

providing a current starting index data holder;

responsive to user request of a next or preceding display page, dynamically generating said display page from said data, said display size indicia data holder, and said current starting index data holder;

displaying to said user mark-up language including a plurality of line items, each line item including a checkbox, said mark-up language being HTML;

responsive to said user selecting said checkbox of said line item, generating a corresponding name/value pair;

storing said name/value pair to a text string;

responsive to said user selecting a submit command, generating from a plurality of name/value pairs in said text string a parameter names array and a parameter values array;

processing said parameter names array to identify each parameter name containing a checkbox indicia, and for each parameter name containing said checkbox indicia, retrieving from detail arrays corresponding line item detail for display to said user;

saving a current document as a draft;

said user selecting or deselecting a line item; and re-executing said processing to identify new data available in said detail arrays or old data no longer available in said detail arrays;

responsive to said user selecting a save as draft command, parsing said name/value pairs in said text string to create a parameter name array and a parameter value array, obtaining for each row selected by key information, and storing said key information in a draft array;

responsive to said user working with said draft array, checking data received from a host system for display to said user against said key information and for line items checked in said draft array, displaying to said user data entered to said parameter value array of said draft array.

3. The program storage device of claim 2, wherein the display size indicia data holder comprises a constant equal to the number of records to be displayed on the screen.

4. The program storage device of claim 2, wherein said saving a current document as a draft comprises saving the current document as a draft in response to said user having clicked on a draft button.

5. A program storage device readable by a machine, tangibly embodying a program of instructions executable by a machine to perform method steps for displaying and processing large data sets responsive to user selection of records displayed while paging through a plurality of pages of said data set during a user session, said method comprising:

storing to detail arrays line item detail;

displaying to a user mark-up language including a plurality of line items, each line item including a checkbox, said mark-up language being HTML;

responsive to said user selecting said checkbox of said line item, generating a corresponding name/value pair;

storing said name/value pair to a text string;

responsive to said user selecting a submit command, generating from a plurality of name/value pairs in said text string a parameter names array and a parameter values array;

storing said parameter names array and parameter values array as an array of user request content variables in a same document for this and all other pages of said user session as said user pages through said dataset;

passing said document containing said request content variable to a load agent for dynamically pulling data from a host for processing said parameter names array to identify each parameter name containing a checkbox indicia, and for each parameter name containing said checkbox indicia, retrieving from said detail arrays corresponding line item detail for display to said user;

saving a current document as a draft;

said user selecting or deselecting a line item; and re-executing said processing to identify new data available in said detail arrays or old data no longer available in said detail arrays;

responsive to said user selecting a save as draft command, parsing said name/value pairs in said text string to create a parameter name array and a parameter value array, obtaining for each row selected by key information, and storing said key information in a draft array; and responsive to said user working with said draft array, checking data received from a host system for display to said user against said key information and for line items checked in said draft array, displaying to said user data entered to said parameter value array of said draft array.

* * * * *